_United States Patent_ [19]

Williams

[11] Patent Number: 4,686,789
[45] Date of Patent: Aug. 18, 1987

[54] INSECT TRAP

[76] Inventor: Clarence O. Williams, 3617 Sheffield Dr., Rocky Mount, N.C. 27801

[21] Appl. No.: 941,738

[22] Filed: Dec. 12, 1986

[51] Int. Cl.⁴ ............................................. A01M 1/04
[52] U.S. Cl. ....................................... 43/113; 43/114
[58] Field of Search .................. 43/107, 113, 115, 114

[56] References Cited

U.S. PATENT DOCUMENTS

| 944,882 | 12/1909 | Laube | 43/114 |
| 1,820,813 | 8/1931 | Loomis | 43/113 |
| 4,566,220 | 1/1986 | Justice | 43/113 |

Primary Examiner—Nicholas P. Godici
Assistant Examiner—Carmine Cuda
Attorney, Agent, or Firm—B. B. Olive

[57] ABSTRACT

An insect trap, particularly suited to trapping fleas, comprises a flat, shallow rectangular pan adapted for resting on the floor, flypaper or other sticky substance confined in the pan for trapping the insects, a rectangular light reflecting cover, wire-formed leg members adapted to resiliently grasp selected edges of the pan in fixed positions and support the cover over the pan, and an electrically energized light source suspended from the light reflecting underside of the cover so as to lure insects to the pan by means of both reflected light and directly radiated light. The color of light seen by the insect may be modified by changing the color of the cover, the light source or the reflective surface.

5 Claims, 3 Drawing Figures

INSECT TRAP

CROSS REFERENCE TO RELATED APPLICATION

The subject matter of the present invention relates to and represents an improvement on the flea trap described in my co-pending patent application Ser. No. 769,260 filed Aug. 26, 1985, entitled "Flea Trap".

TECHNICAL FIELD

The present invention relates to insect traps and particularly to a trap for luring and exterminating fleas.

BACKGROUND ART

Insects are known to be attracted to different colored light sources. U.S. Pat. No. 4,157,629 teaches use of a specific invisible light source, namely, UV radiation, for attracting flying insects. U.S. No. Pat. No. 3,513,585 teaches a trap for trapping flying insects in which upwardly reflected light as well as upwardly radiated light from a visible flourescent lamp source is used to attract flying insects. Fleas, unlike flying insects, move by leaping or hopping from position to position by reason of being wingless and non-flying. A white electric light suspended over a pan of water has been used but has not proven effective for trapping large numbers of fleas. Because of the nature of fleas, a trap for trapping wingless, non-flying fleas must take into account many considerations that do not effect traps for trapping flying insects. Thus, a flea trap must be accessible to the fleas that hop from a source such as a carpet infested with fleas. A trap which is positioned several feet in the air may be completely suitable for catching flying insects but may be totally unsuited for catching fleas.

U.S. Pat. No. 4,566,220 describes an effective yet simple flea trap upon which the present invention seeks to improve. In the flea traps of prior U.S. Pat. No. 4,566,220 a green light is used as the light source. The green light source is suspended immediately below a cover having a light reflective surface and the reflected green light as well as the directly radiated green light is directed downwardly to a shallow pan having a sticky substance and over which the light and cover are supported.

The insect trap described in my copending application Ser. No. 769,260 provided wire-formed members adapted to be flexed and grasp the pan to support the cover. Such wire-formed cover support members could also be shipped as part of a compact package. However, it has been found that since the wire-formed members had no defined grasping positions on the pan, the user has had difficulty in maintaining the cover in proper alignment. Also, while a green light has been found useful for attracting fleas, no provision was made for using other colors more attractive to other types of insects. The present invention seeks to improve on these deficiencies.

DISCLOSURE OF INVENTION

In accordance with the present invention, applicant improves on a flea trap of the type comprising a shallow base pan, a sticky liquid or other sticky substance within the shallow base pan, a light reflecting cover positioned and supported over the pan and an electrically energized light source suspended from the bottom of the cover. Fleas attracted to the reflected and directly radiated light from the light source jump over the side wall of the shallow pan into the sticky substance which in turn prevents escape and eventual extermination of the fleas. The present invention is directed to providing improved wire-formed leg members adapted to be flexed and grasp an improved pan at fixed positions to support the cover. The invention, while primarily directed to catching fleas also provides for use of different colors of reflected light to trap both wingless, non-flying as well as flying insects.

BEST MODE FOR CARRYING OUT THE INVENTION

Figure 1:
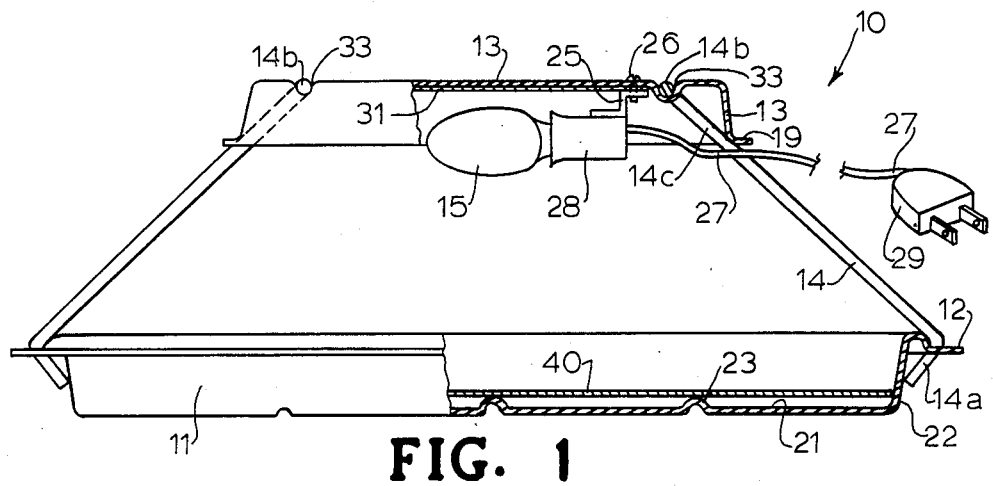
FIG. 1 is a side elevation partially broken-away view of the invention flea trap with a sheet of sticky paper installed.
Figure 2:
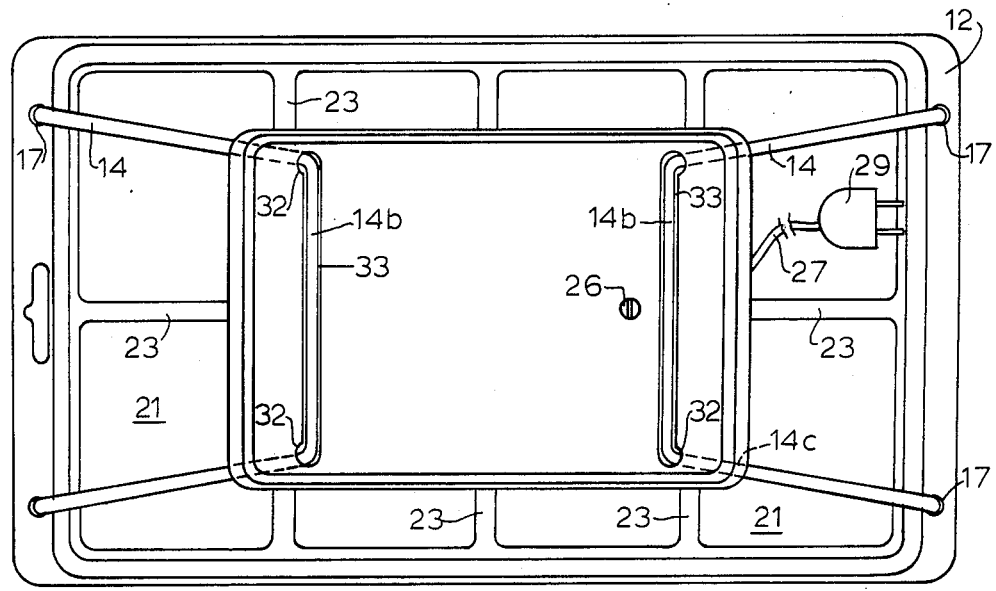
FIG. 2 is a plan view of the flea trap of FIG. 1 with the sticky paper removed for purpose of illustration.
Figure 3:
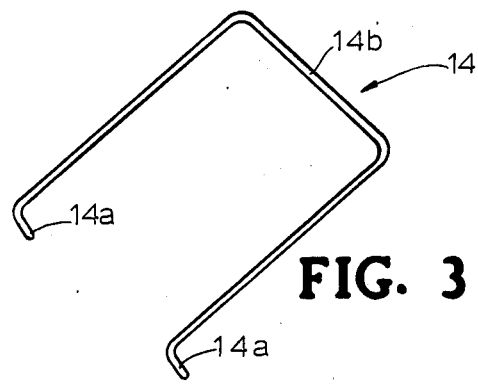
FIG. 3 is a perspective view of one of a pair of expandable leg members employed with the invention flea trap.

Referring to the drawings flea trap 10 in accordance with the invention as illustrated in FIGS. 1-2 comprises a shallow, rectangular, plastic-molded pan 11, a smaller rectangular plastic-molded light reflective cover 13 supported in a vertically spaced relation a few inches, e.g., 3 to 6 inches, above pan 11 by specially wire-formed expandable legs 14 which snap-fit in fixed positions to the end sidewalls of pan 11 and to which the present invention is directed. An electrically energized incandescent green light source 15 is secured to the underside of cover 13 so as to utilize the light reflective surface of the underside of cover 13. A 3 to 5 inch space between light 15 and pan 11 has proven effective. Pan 11 has a surrounding horizontal ledge 12, a substantially flat bottom wall 21 strengthed by ribs 23 and upstanding side/endwalls 22 which are sufficiently low in height to allow fleas to jump over such walls.

In use, trap 10 is supported by pan 11 resting on a flea infested rug or other surface. In one embodiment, the walls 22 were approximately ¾ inch high and pan 11 was approximately 10½ inches by 6 inches in interior length and width. Cover 13 had side and end walls approximately ½ inch deep and was approximately 6 inches by 4 inches in interior length and width. Cover 13 provided a white surface for reflecting the green light which in the dark gave an overall green appearance. Light 15 comprised a 120 volt, 1/10 watt green light of the shape illustrated with the bulb portion approximately 1⅜" in length and with the diamter D being approximately ⅞", a typical Christmas tree light size and shape.

A bracket 25 holds light source 15 in place suspended from the underside of cover 13. Bracket 25 is held in place by screw 26 screwed into bracket 25. Cord 27 extends from socket 28 and through plug 29 connects to a conventional wall outlet such as a baseboard receptacle as a source of electricity. As previously mentioned, the underside of cover 13 is light reflective. Thus, when trapping fleas both downwardly reflected green light as well as downwardlydirected radiated green light is transmitted towards pan 11 and outwardly towards the fleas.

For trapping insects other than fleas, the light source 15 may be a color other than green or a white light source can be employed with a removable reflective sheet 31 (FIG. 1) of selected color. Alternatively, a stick-on reflective surface of suitable color over light source 15 can be used. Also contemplated is painting or molding the entire underside of cover 13 in a selected color, i.e., green, to produce with a suitable light source 15, e.g., white, a suitable light source of color most attractive to the insects desired to be caught. Thus, the basic invention structure can be employed for a variety of insects other than fleas.

Light reflecting cover 13 is supported above pan 11 by wire-formed legs 14 so as to provide open space between cover 13 and pan 11 through which the fleas hop to reach the sticky substance in pan 11. Legs 14 are formed as bent metal wire members which may be flexed and spread apart to aid in assembly. Top cover 13 has two pair of holes 32 through which the free ends of legs 14 are passed. The free ends of legs 14 are right-angled as at 14a to fit in holes 17 on ledge 12 of pan 11. Ends 14a are fed through holes 32 until the closed ends 14b of legs 14 reside in grooves 33 and are flush with the top surface of cover 13. Arm portions 14c of legs 14 engage and reside against the interior end wall surface 19 of cover 13. Legs 14 are formed such that they can be bent outwardly, be inserted and fixedly positioned in holes 17 and then released to grab the ledge 12 and at opposite ends of pan 11 as illustrated. Flea trap 10 may be shipped in a flat dismantled condition with the parts disassembled and nested and then quickly assembled by the purchaser.

In operation, the basic principal is to lure fleas into pan 11 by means of the light source and it has been discovered through testing, as previously set forth in Pat. 4,566,220 that for trapping fleas a reflected green light source works most favorably. A conventional low wattage, green-colored, incandescent bulb of the typical household night-light or Christmas tree light size meets the desired requirements of the invention. Also, the presence of a cover with a reflectorized inside surface supported a few inches over pan 11 has also been discovered to enhance the efficiency of the trap as has use of a pan with low sidewalls for holding the flea trapping means. A sticky landing surface is provided by a sticky liquid or by a sheet of commercially-available sticky flypaper 40 placed in the bottom of pan 11 over ribs 23. Pan 11 rests on the floor of a room, an infested rug or the like making the pan readily accessible to the hopping fleas. The reflected and directly radiated green light lures the fleas to pan 11 which necessitates the fleas jumping over the low sidewalls of pan 11 which they are able to do and through the open space provided between pan 11 and cover 13. As previously mentioned, a thin layer of sticky liquid may be used in pan 11 in place of flypaper 40. The liquid if used is preferably of an oily formula which is non-toxic and adapted for safe use in a home where there are small children and pets. Liquids such as corn oil, peanut oil, Wesson oil, Crisco, baby oil, mineral oil, and castor oil are all effective sticky liquids and have been discovered as non-offensive to the fleas. Whatever sticky substance is selected, it should be sufficiently sticky to adhere to the fleas once contact is made between the flea and the sticky substance. The fleas are attracted to the reflected and directly radiated green light, jump toward the light and into the liquid or flypaper in the bottom of pan 11 and are thus trapped in the pan until they die.

The invention flea trap advantageously lures fleas from carpet and furniture wherein conventional methods of spraying for fleas tends to drive the fleas to other areas. Also, while spraying kills adult fleas, it dissipates and is virtually non-effective for killing of young fleas to come from eggs left in the area. The invention flea trap attracts daily any fleas in the area and over a period of time has been found to effectively eliminate virtually all fleas in that area. While primarily intended to lure and trap fleas it is recognized that other insects may also be trapped and exterminated by the invention device. Thus, by appropriate selection of the color light source, color of the light reflective surface and color of the cover those light color conditions most suited to the type insect sought to be trapped can be established.

Ease of shipping as a knock-down assembly is uniquely assisted by use of the special wire-formed leg members 14 which can be shipped disassembled from cover 13. At the site of use, the respective leg members 14 can be easily inserted in the respective grooves 33 and mounting holes 32, flexed and fixedly located in holes 17 to grasp ledge 12 of pan 11 to support cover 13 after which light source 15 is easily assembled as illustrated. Since leg members 14 are effectivly fixedly positioned in holes 17 the correct position of cover 13 is assured thereby correcting the previously encountered problem. Also, when downward pressure is unexpectedly applied on cover 13 the trap 10 cannot collapse as was possible with prior traps of the same type.

What is claimed is:

1. A trap for catching insects, comprising:
(a) a rectangular shallow pan having and supported by a substantially flat bottom wall enabling said pan to be accessible to a source of insects to be trapped and having formed edge portions on each of two opposed upstanding side walls thereof with spaced apart pairs of holes formed in each respective edge portion;
(b) a sticky substance disposed in said pan and providing a sticky landing surface above said bottom wall for live insects to be trapped and killed;
(c) a rectangular cover of selected color having within downwardly extending sidewalls a light reflective horizontal bottom surface of selected color and at each end thereof a spaced apart pair of holes extending through said surface with each respective pair of holes being located in a downwardly extending groove formed in said cover above said bottom surface and extending widthwise thereof;
(d) support means comprising a pair of wire-formed leg members, each said wire-formed leg member having a central portion resting against the top surface of said cover in a respective said groove and leg portions extending from opposite edges of said central portion downwardly through a selected pair of said holes in said cover, each said leg portion having an intermediate portion formed to rest against a lower sidewall surface of said cover, downwardly extending legs, the lower end of each said leg being formed to pass through a respective hole in a respective said edge portion and grasp a respective said shallow pan formed edge such that when said legs are spread apart said intermediate portions bear against lower sidewall surfaces of said cover and said lower ends are detachably fixed in position and tend to resiliently grasp those portions of said shallow pan formed edge portion around the holes in which the respective lower ends reside to thereby support said cover in vertically-spaced and predetermined fixed relation over said pan with said light reflective surface opposing the bottom wall of said pan and located to provide open unobstructd space between said cover and pan to permit said insects to jump through said space into said pan to contact said sticky landing surface; and (e) an electrically energized visible light source of selected color, said light source being secured to said cover below said light reflective surface thereby generating and exposing to the insects sought to be trapped both reflected downwardly transmitted light and downwardly and outwardly transmitted directly radiated light mixed with said reflected light from said source.

2. A trap as claimed in claim 1 wherein said cover is of a selected non-white color and in conjunction with the selected color of said light source provides said radiated and transmitted light in a color uniquely suited to attract the insects sought to be trapped.

3. A trap as claimed in claim 1 wherein said light reflective surface comprises a surface of selected color formed on a removable sheet member secured to said cover above said light source.

4. A trap as claimed in claim 1 wherein said insects comprise fleas and said light source comprises a green light source attractive to said fleas.

5. A trap as claimed in claim 1 wherein said light reflective surface is green and said light source is white.

* * * * *